United States Patent Office 3,320,193
Patented May 16, 1967

3,320,193
HARDENING OF EPOXY COMPOUNDS WITH TRISUBSTITUTED TRIETHANOL - AMINE TITANATES
Hans J. Beck and Karl W. Schmidt, Hamburg, and Gunther Weigel, Hamburg-Wandsbek, Germany, assignors to Dr. Beck & Co., G.m.b.H., Eiselensweg, Germany
No Drawing. Filed Jan. 21, 1963, Ser. No. 252,608
Claims priority, application Germany, Jan. 22, 1962, B 65,603
10 Claims. (Cl. 260—18)

The present invention relates to the hardening of epoxy compounds, and more particularly to new hardening agents and to the use thereof in the production of hard to highly elastic, non-meltable and inslouble synthetic resins from epoxy compounds.

It is a primary object of the present invention to provide new polymeric trisubstituted-amine-titanate complexes which are particularly useful as hardening agents for epoxy compounds.

It is another object of the present invention to provide for the hardening of epoxy compounds with the new polymeric trisubstituted-amine-titanate complexes of the present invention.

As yet another object, the present invention contemplates the improvement in the properties of epoxy resins by the hardening thereof with the polymeric trisubstituted-amine-titanate complexes of the present invention both alone and in combination with other hardeners and/or accelerators.

Other objects and advantages of the present invention will be apparent from a further reading of the specification and of the appended claims.

With the above and other objects in view, the present invention mainly comprises as new hardening agents a poymeric trisubstituted-amine-titanate complex of the formula:

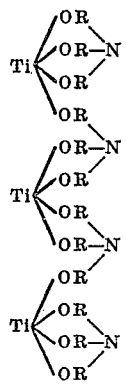

wherein R is selected from the group consisting of aliphatic, cycloaliphatic, aromatic and heterocyclic radicals.

Although all polymeric trisubstituted-amine-titanate complexes of the above formula can be used for the purposes of the present invention, for reasons of availability of the reactants from which the complexes are formed, it is preferred according to the present invention that R be an alkyl of up to 8 carbon atoms. The most preferred alkyls are ethyl and isopropyl, the corresponding complexes for these radicals being triethylamine titanate complex and triisopropylamine titanate complex.

The complexes of the present invention are produced by the reaction of 3 mols of a titanic acid ester of the formula:

Ti(—OR)$_4$ with 4 mols of a trialcoholamine of the formula:

N(—ROH)$_3$ wherein R has the same definition as above. As indicated, for reasons of availability it is preferred that R be an alkyl of up to 8 carbon atoms, and most preferably that R be ethyl or isopropyl.

The advantages in the use of the trisubstituted-amine-titanate complexes of the present invention, as well as further details with respect to the production thereof and the use thereof, will be apparent in the further discussion which follows.

In general the present invention relates to the hardening of all types of epoxy compounds. Among the epoxy compounds which can be hardened according to the present invention are polyglycidyl esters (diglycidyl and higher), which can be obtained in known manner by the reaction of epichlorohydrin or dichlorohydrin with a polycarboxylic acid (dicarboxylic acid or higher) in the presence of an alkali.

The present invention is also applicable to epoxidized compounds, such as those obtained by the epoxidizing of diolefins, dienes, including cyclic dienes, and diolefinic unsaturated carboxylic acid esters including those which also contain two cyclohexenyl radicals.

Also suitable are glycidyl polyethers, such as those obtained by known method by reacting a polyvalent alcohol (divalent or higher) or a polyvalent phenol (divalent or higher) with epichlorohydrin or dichlorohydrin in alkaline medium. Moreover, basic polyepoxide compounds can be used, such as those obtained by alkaline condensation of primary or secondary aromatic amines with epichlorohydrin.

Most suitable for hardening according to the present invention are the room temperature liquid epoxy resins such as those produced for example from bis-(4-oxyphenyl-1)-2,2-propane ("Bisphenol A"). The present invention is, however, also applicable to solutions of higher condensed solid epoxy resins.

Usually epoxy resins are treated with a hardener, for example amines or anhydrides of polybasic carboxylic acids, at room temperature or higher temperature. This results in the conversion of the resin into unmeltable and insoluble products. The use of hardened epoxy resins as casting resins for electro technical purposes and other formed objects is a most important use thereof. In addition, resins reacted with hardening agents find practical use as protective coatings, adhesives, foils, foamed resins, molded articles and foundation surfacing materials. The epoxy resins hardened with the hardening agents of the present invention can be used for all of these purposes, however, the resins having improved properties and therefore being still more suitable for these purposes as well as for other purposes.

The hitherto most generally used hardening agents for epoxy resins, namely the used amines or acid anhydrides have, however, known faults. Thus, for example, because of the generally too short time period from the mixing of the epoxy resin with the amine until the gelling of the resin-hardener-combination, it is usually necessary to work up the mixtures immediately after the mixing. Mixtures which are not worked up must be discarded. In addition, many of the hitherto used organic amines are toxic and volatile and require particular care in their use.

The main difficulty in the use of acid anhydrides as hardeners is that a long period of heating is necessary in order to harden such resin-hardener combinations. Furthermore, the anhydride hardeners, similarly to the organic amine hardeners, have the disadvantage that after mixing with epoxy resins only a limited storage time is possible.

Therefore, the demand is made for hardeners which are to the greatest extent possible physiologically harmless, non-volatile and odorless, so that they can be worked up without danger. Furthermore, with respect to such hardeners, it is desirable to have the same which can be used in varying proportions.

Alcoholates of polyvalent metals, such as titanic acid esters, are known as very quick hardening agents for epoxy resins. The disadvantage of these hardeners is, however, that the hardening reaction proceeds in an uncontrollably fast manner, and the mixture to the greatest extent immediately gelatinizes. Moreover, the alcohol splits off during the hardening reaction, and either evaporates or remains as an undesired softener in the hardened epoxy resin.

It is also known to use as hardener for epoxy resins the reaction products of titanic acid esters with amines. The amines used are such amines as diamines, ethanolamine and the like, which with the titanic acid ester forms a 5 ring complex. Several of these metal complexes also harden at normal temperature.

It has also been proposed to use a liquid mixture of trialkylolamine-titanic acid esters and boric acid esters or borax derivatives as hardeners for epoxy resins. These chelate acid esters of titanium are produced from 1 mol of titanic acid ester, for example butyl titanate, and 2 mols of trialkylolamine, for example triethanolamine, whereby 2 mols of the lower boiling alcohol are distilled off from the titanic acid ester.

These room temperature stable titanium-modified trialkylolamines give upon heating between 100 and 200° C. insoluble and non-meltable synthetic resins. A major disadvantage of resin-hardener mixtures using these hardeners is, however, that alcohols split off as side products during the hardening reaction. Consequently the hardened resin contains varying amounts of alcohol, which upon hardening at higher temperatures to some extent are evaporated or remain as softener in the hardened resin.

It has now been quite surprisingly found that the polymeric trisubstituted-amine-titanate complexes of the present invention, that is a complex formed by the reaction of 3 mols of a titanic acid ester of the formula:

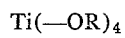

with 4 mols of a trialcoholamine of the general formula:

wherein R is an aliphatic, cycloaliphatic, aromatic or heterocyclic radical, most preferably an alkyl group of up to 8 carbon atoms, and still more preferably ethyl or isopropyl, when used as hardeners for epoxy resins avoid all of the above enumerated disadvantages of the known hardeners for epoxy resins, and result in the production of hard to highly elastic, unmeltable and insoluble synthetic resins.

These polymeric trisubstituted-amine-titanate complexes of the present invention are solid at room temperature and can be used either in this form or in the form of solution thereof in alcohols, hydroxyl group-containing monoethers or polyethers (diethers or higher), saturated or unsaturated drying oils or non-drying oils, phenol fatty acid derivatives, trialkylphosphites, triarylphosphites or other known modifying agents for the hardening of epoxy compounds.

It is advantageous according to the present invention, depending upon the desired properties of the hardened polyepoxide resin, to dissolve the normally solid polymeric trisubstituted-amine-titanate complexes, such as the trialkylamine-titanate-complexes of the present invention, in suitable softening agents such as dibutylphthalate, or in inert diluting agents.

The cross-linked products obtained with these polymeric metal modified trialkylolamine compounds exhibit good mechanical and electrical properties. The hardening proceeds at higher temperatures slower than with the known anhydrides, polyamines or polyamideamine hardeners. This results in the great advantage of lessened self-heating during the hardening process so that less shrinkage occurs in the final hardened products, which is a great advantage in the use of these products of many different purposes.

The new hardening agents of the present invention act primarily as catalyst. This results in the advantage of lessened amounts of hardener addition, whereby the ratio of the epoxy resin and the solid or dissolved polymeric trisubstituted-amine-titanate complex active hardening agent can be varied within a great range of proportions. By the choice of the proper proportions the properties of the hardened polyepoxide can be considerably influenced and the duration of the working up of the product can be adjusted for the requirements of the particular art. It should further be emphasized that the compounds of the present invention when used as hardeners are practically completely physiologically harmless, are non-volatile, are odorless, and can consequently be worked up and used as hardeners without danger. They also are flame-retardant.

Depending upon the used metal complexes and modifying agents, the resin-hardener mixtures of the present invention can stand at normal temperature for several days to several weeks without the addition of any stabilizing agents, without the resin changing over into undesired unmeltable condition. This property is particularly valuable in the production of laminated plastics and molded articles, whereby the resin-impregnated webs or filler materials must remain stable and after a relatively long period of time still be able to be pressed into the desired shape.

Advantageously, the polymeric trisubstituted-amine-titanate complexes of the present invention can be dissolved in known polyamines and/or polyamideamine hardeners. In this special form, the resin-hardener mixtures harden at room temperature in a relatively short time as compared to the sole use of the hardeners of the present invention. The thus produced resin is harder and tougher at higher temperatures and exhibits better dielectric values than do resins which are hardened only with the known polyamideamine hardeners. A further shortening of the hardening time with the hardeners of the present invention as well as their mixtures with other hardeners can be achieved by the addition of known accelerators. Also in these cases, no side products are split off which volatilize or remain as softeners.

An addition of a small amount of dimethyl formamide to the resin-hardener mixtures of the present invention lowers the viscosity and increases the time of working up the resin.

Depending upon the properties desired for the hardened resin, the polymeric trisubstituted-amine-titanate complexes of the present invention, preferably the trialkylamine titanates, are added to the epoxy compound in an amount of about 5–50% by weight. However, other proportions can also be used. If a higher amount of hardener is used, the elasticity and impact strength of the resin is improved. With the use of lesser amounts of hardener, the product obtained has a higher heat stability and improved chemical resistance. Polyepoxides produced from the resin-hardener combinations of the present invention possess extraordinarily smooth surfaces and exhibit good flexibility as molded resins even at low temperatures.

The hardening of the epoxide resins can be simply carried out, since the polymeric trialkylamine-titanates can either be added in molten condition or dissolved in any of the above mentioned modifying agents or the like. The hardening reaction preferably proceeds at higher temperatures between 40 and 200° C., most preferably at temperatures between 80 and 120° C. The obtained synthetic resins are free of bubbles and have a yellowish to yellow-brown color.

The polymeric trisubstituted-amine-titanate complexes of the present invention can be produced in known manner by reacting 3 mols of the titanic acid ester with 4 mols of the trialcoholamine, whereby an exchange of hydrogen atom of the trialcoholamine with the distilling off of the titanium-bound alcohol occurs.

As starting material all titanic acid esters of the general formula:

$$Ti(-OR)_4$$

and trialcoholamines of the general formula:

$$N(-ROH)_3$$

wherein R is aliphatic, cycloaliphatic, arylaliphatic or heterocyclic, can be used.

In the reaction the remaining titanate contains as alcohol component only the tertiary trialcoholamine, the reaction proceeding in accordance with the following equation:

$$3Ti(-OR')_4 + 4N(-R''OH)_3 \rightarrow Ti_3-[(OR'')_3N]_4 + 12R'OH$$

Consequently it is advantageous to use in the reaction a titanic acid ester of a lower boiling alcohol, for example butyl titanate, and a higher boiling trialcoholamine. The low boiling alcohol is preferably distilled off under reduced pressure at a temperature between 60 and 100° C., and what remains is a solid, yellowish product with a melting point between 80 and 82° C.

Since it is the alcohol of the trialcoholamine which remains in the final titanium complex, it is the availability of such trialcoholamines which determines the alcohol of the final complex. Actually all trisubstituted alcohol amine-titanate complexes of the present invention which fall within the general formula given herein are suitable for the purposes of the present invention. However, for reasons of ready availability the most preferred are triethylamine titanate complex, triisopropylamine titanate complexes, triisobutylamine titanate complex, triisoamylamine titanate complex, trihexylamine titanate complex, and with respect to the arylamine complexes, since the most available triarylolamine is tris(2-oxybenzyl)-amine, the most preferred triarylamine titanate complex is that which is obtained by esterifying 4 mols of this arylolamine with a titanic acid ester of an alcohol which is easily volatile.

The resin-hardener mixtures of the present invention using the polymeric trialcohol substituted amine-titanate complexes and known liquid, solid or dissolved epoxy resins can be used for the production of cast resins, protective coatings, laminated resins, adhesives, etc. Furthermore, the same can contain the usual filler materials such as quartz powder, ground shale, chalk, alumina, minerals, graphite, etc., as well as pigments, softeners or solvents, and can be used for the production of molded articles and foundation surfacing.

The following examples are given to further illustrate the present invention. The scope of the invention is not, however, meant to be limited to the specific details of the examples.

*Example A*

This example is given to illustrate the production of the trialcohol-substituted-amine-titanate complexes of the present invention.

1020 g. (3 mols) of butyltitanate are mixed with 764 g. (4 mols) of triisopropanolamine, and under vacuum of 18 mm. Hg esterified up to a temperature of 150° C., whereby the butanol which is set free (870 g.) is distilled off. There remains as residue 880 g. of a solid product with a melting point of 70–80° C. The product is triisopropylamine-titanate complex.

*Example B*

The same procedure is followed as in Example A, however substituting 596 g. of triethanolamine for the 764 g. of triisopropanolamine.

The following examples are given to illustrate the use of the complexes of the present invention for the hardening of epoxy resins:

*Example 1*

To 100 g. of a liquid epoxy resin with an epoxide equivalent weight of about 200, produced in known manner by alkaline condensation of bis-(4-oxyphenyl)-2,2'-propane (Bisphenol A) and epichlorohydrin, are added 10 g. of molten triethylamine titanate. The resin-hardener mixture is poured into a mold and in 16 hours at 120° C. is completely hardened. The time of working up of the mixture amounts to 2 to 2½ hours at 120° C. The obtained transparent casting has a Martens value of 90°.

*Example 2*

100 g. of the epoxy resin used in Example 1 is mixed under stirring with 20 g. of molten triisopropylamine-titanate. The obtained resin-hardener mixture is further worked up during a time period of 2 hours at 120° C. The mixture which had been poured into a mold is hardened for 15 hours at 120° C. and 3 hours at 150° C. There is thus obtained a transparent, bubble-free molded body with a heat deformation temperature according to Martens of 105° C.

*Example 3*

100 g. of the epoxy resin of Example 1 are thoroughly mixed with 30 g. of a mixture of 15 g. of triisopropylamine-titanate and 15 g. of ethylene glycol. The mixture is completely odorless and after at least 4–6 weeks can still be worked up without problem, and without passing into gelled condition. The hardening of the resin-hardener combination is accomplished in 20 to 24 hours at 120° C. The obtained cast body is hard and smooth and exhibits a Martens value of 90°.

*Example 4*

30 g. of a hardener solution of 15 g. of triisopropylamine-titanate in 75 g. of polyethylene glycol having a molecular weight of 281 are stirred into a resin mass formed of a mixture of 100 g. of the epoxy resin of Example 1, 25 g. of furfurylglycidyl ether and 2 g. of dimethyl formamide. The resin-hardener mixture is odorless and exhibits a starting viscosity of about 500 cp. After storage at normal temperature the viscosity after 3 months is increased to only about 5000 cp., so that the mixture can still be worked up without great difficulty. At 120° C. during a time period of 20–24 hours the mixture is completely hardened. There is thus obtained a bubble-free, tough-elastic molded body with a Martens value of 55°.

*Example 5*

A resin-hardener mixture produced in the same manner as in Example 4, however, without the addition of dimethyl formamide, after 3 months standing at room temperature exhibits a viscosity which is more than double that of the resin-hardener mixture of Example 4. The hardening of the resin-hardener combination proceeds as in Example 4 and the heat deformation temperature according to Martens is the same as in Example 4.

*Example 6*

Following the procedure of the prior examples another casting resin was produced using 100 g. of a liquid epoxy resin with an epoxide equivalent weight of about 200, 15 g. of triisopropylaminetitanate, 15 g. of polyethylene glycol having a molecular weight of 281, and 1 g. of tris-(dimethyl-aminomethyl)-phenol. The reaction temperature of 90° C. used for the working up increases due to the heat of reaction to 120° C. The resin-hardener mixture is completely hardened by heating 3 hours at 100° C. and then 6 hours at 120° C. There is obtained a smooth, bubble-free casting of good heat resistance, elasticity and hardness.

*Example 7*

To 100 g. of an epoxy resin of Example 1 there is added a mixture of 15 g. of triisopropylaminetitanate, 15 g. of polyethylene glycol and 10 g. of tetrahydroxyethylethylene diamine. The resin-hardener mixture is heated to a working temperature of 90° C. and the reaction temperature increases by the heat of reaction to 129° C. However, the resin-hardener mixture remains still liquid and easily workable after the fading away of the heat of reaction. At 100° C. the mixture gelatinizes during 3 hours, and the complete final hardening is achieved after 6 hours at 120° C. The obtained bubble-free, smooth cast body exhibits a very slight shrinkage, good heat stability, elasticity and hardness.

*Example 8*

100 g. of a liquid epoxy resin of Example 1 is mixed with 55 g. of a hardener mixture which consists of 41.2 g. of a polyamideamine obtained by condensation of dimerized, unsaturated fatty acid with a polyamine, 6.9 g. of triisopropylaminetitanate, and 6.9 g. of polyethylene glycol with a molecular weight of 281. The resin-hardener mixture increases its temperature by the heat of reaction from room temperature to a temperature of 85° C., and hardens during 1½ hours to an amber-colored hard cast body having a heat deformation temperatiure according to Martens of 55° C., and possessing good elasticity.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In the method of hardening an epoxy compound by heating the same, the improvement which comprises using as a hardening agent a trisubstituted-amine-titanate of the formula:

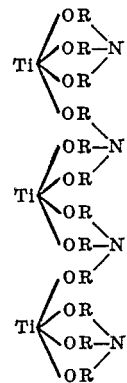

wherein R is alkyl of up to 8 carbon atoms, whereby the epoxy compound can be hardened to a from hard to highly elastic, unmeltable and insoluble resin.

2. In the method of hardening an epoxy compound by heating the same, the improvement which comprises using as a hardening agent a trisubstituted-amine-titanate of the formula:

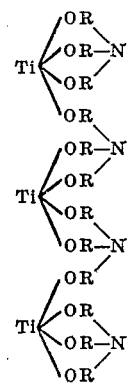

wherein R is ethyl, whereby the epoxy compound can be hardened to a from hard to highly elastic, unmeltable and insoluble resin.

3. In the method of hardening an epoxy compound by heating the same, the improvement which comprises using as a hardening agent a trisubstituted-amine-titanate of the formula:

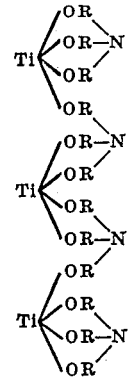

wherein R is isopropyl, whereby the epoxy compound can be hardened to a from hard to highly elastic, unmeltable and insoluble resin.

4. In the method of hardening an epoxy compound by heating the same, the improvement which comprises using as a hardening agent a solution of a trisubstituted-amine-titanate of the formula:

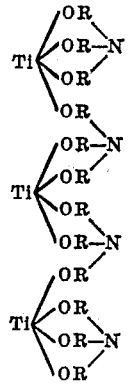

wherein R is alkyl of up to 8 carbon atoms dissolved in a solvent therefor which is also a modifying agent for said epoxy compound and being selected from the group consisting of alcohols, hydroxyl group-containing mono-, and polyethers, saturated and unsaturated drying oils and non-drying oils, phenol fatty acids, trialkylphosphites and triarylphosphites, whereby the epoxy compound can be hardened to a from hard to highly elastic, unmeltable and insoluble resin.

5. In the method of hardening an epoxy compound by heating the same at a temperature between 40 and 200° C., the improvement which comprises using as a hardening agent a solution of a trisubstituted-amine-titanate of the formula:

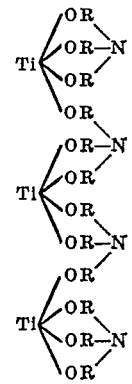

wherein R is alkyl of up to 8 carbon atoms dissolved in a solvent therefor which is also a modifying agent for said epoxy compound and being selected from the group consisting of alcohols, hydroxyl group-containing mono- and polyethers, saturated and unsaturated drying oils and non-drying oils, phenol fatty acids, trialkylphosphites and triarylphosphites, said trisubstituted-amine-titanate being present in an amount equal to between about 5 and 50% of the weight of said epoxy compound, whereby the epoxy compound can be hardened to a from hard to highly elastic, unmeltable and insoluable resin.

6. In the method of hardening an epoxy compound by heating the same, the improvement which comprises using as a hardening agent a trisubstituted-amine-titanate of the formula:

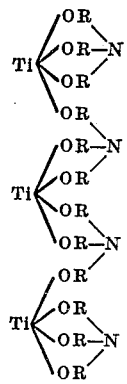

wherein R is alkyl of up to 8 carbon atoms along with a poly-amine hardening agent, whereby the epoxy compound can be hardened to a from hard to highly elastic, unmeltable and insoluble resin.

7. In the method of hardening an epoxy compound by heating the same, the improvement which comprises using as a hardening agent a trisubstituted-amine-titanate of the formula:

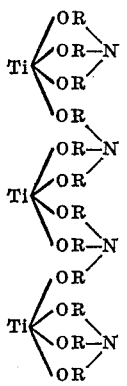

wherein R is alkyl of up to 8 carbon atoms along with a polyamideamine hardening agent, whereby the epoxy compound can be hardened to a from hard to highly elastic, unmeltable and insoluble resin.

8. In the method of hardening an epoxy compound by heating the same, the improvement which comprises hardening an epoxy compound selected from the group consisting of the reaction product of a polycarboxylic acid with epichlorohydrin, the reaction product of a polycarboxylic acid with dichlorohydrin, epoxidized diolefins, epoxidized dienes, epoxidized diolefinic unsaturated carboxylic acid esters, the reaction product of a polyvalent alcohol with epichlorohydrin, the reaction product of a polyvalent alcohol with dichlorohydrin, the reaction product of a polyvalent phenol with epichlorohydrin, the reaction product of a polyvalent phenol with dichlorohydrin, the alkaline condensation product of a primary aromatic amine with epichlorohydrin and the alkaline condensation product of a secondary aromatic amine with epichlorohydrin using as a hardening agent a trisubstituted-amine-titanate of the formula:

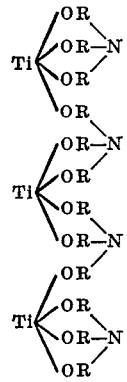

wherein R is alkyl of up to 8 carbon atoms as the hardening agent, whereby the epoxy compound can be hardened to a from hard to highly elastic, unmeltable and insoluble resin.

9. In the method of hardening an epoxy compound by heating the same with a hardening agent, the improvement which comprises using as a hardening agent a trisubstituted-amine-titanate of the formula:

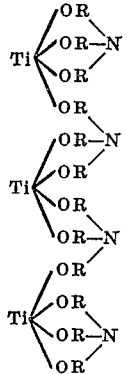

obtained by the reaction of 3 mols of a titanic acid ester of the formula $Ti(-OR)_4$ with 4 mols of a trialcoholamine of the formula $N(-R'OH)_3$, wherein R and R' each is an alkyl with up to 8 carbon atoms, whereby the epoxy compound can be hardened to a from hard to highly elastic, unmeltable and insoluble resin.

10. A method as defined in claim 9, wherein R is selected from the group consisting of ethyl and isopropyl.

References Cited by the Examiner

UNITED STATES PATENTS

| | | | |
|---|---|---|---|
| 2,935,522 | 5/1960 | Samour | 260—429.5 |
| 3,091,625 | 5/1963 | Gilsdorf | 260—429.5 |
| 3,144,421 | 8/1964 | Yost | 260—18 |
| 3,170,887 | 2/1965 | Ramos | 260—18 |

FOREIGN PATENTS

| | | |
|---|---|---|
| 941,430 | 4/1956 | Germany. |
| 1,124,047 | 10/1959 | Germany. |

DONALD E. CZAJA, *Primary Examiner.*

LEON J. BERCOVITZ, C. W. IVY, *Assistant Examiners.*